United States Patent
Hu et al.

(10) Patent No.: US 11,036,796 B2
(45) Date of Patent: *Jun. 15, 2021

(54) VIDEO CLIPS GENERATION SYSTEM

(71) Applicant: International Business Machines Corporation, Armonk, NY (US)

(72) Inventors: Jing Jing Hu, Beijing (CN); Ling Ma, Beijing (CN); Graham A. Watts, Ottawa (CA); Xiao Jin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/204,011

(22) Filed: Nov. 29, 2018

(65) Prior Publication Data

US 2019/0095394 A1    Mar. 28, 2019

Related U.S. Application Data

(63) Continuation of application No. 14/830,402, filed on Aug. 19, 2015, now Pat. No. 10,255,361.

(51) Int. Cl.
   *G06F 16/74*    (2019.01)
   *G06F 16/78*    (2019.01)
   *G06F 16/738*   (2019.01)

(52) U.S. Cl.
   CPC ........ *G06F 16/7867* (2019.01); *G06F 16/739* (2019.01); *G06F 16/743* (2019.01)

(58) Field of Classification Search
   CPC ... G06F 16/7867; G06F 16/743; G06F 16/739
   USPC .................................................. 707/722, 803
   See application file for complete search history.

(56) References Cited

U.S. PATENT DOCUMENTS

| | | |
|---|---|---|
| 8,270,487 B1 | 9/2012 | Kizhepat et al. |
| 8,988,458 B2 | 3/2015 | Cheswick |
| 9,129,008 B1 | 9/2015 | Kuznetsov |
| 9,256,676 B2 * | 2/2016 | Frumkin ............... G06F 3/0484 |
| 9,384,178 B2 | 7/2016 | Nydam et al. |
| 9,715,901 B1 * | 7/2017 | Singh ................. H04N 21/8456 |
| 2002/0089646 A1 | 7/2002 | Chang |

(Continued)

FOREIGN PATENT DOCUMENTS

JP    10214024 A    8/1998

OTHER PUBLICATIONS

IBM, List of IBM Patents or Patent Applications Treated as Related, Appendix P, dated Nov. 30, 2018, 2 pages.

(Continued)

*Primary Examiner* — Hanh B Thai
(74) *Attorney, Agent, or Firm* — James W. Kappos

(57) ABSTRACT

A method for generating a preview associated with a media file is provided. The method may include receiving a plurality of social comments associated with a plurality of frames corresponding to the media file. The method may also include storing the received plurality of social comments in a repository, whereby the received plurality of social comments is stored with a frame marker. The method may further include analyzing the stored plurality of social comments. The method may additionally include classifying the analyzed plurality of social comments according to at least one sentiment and at least one keyword in the media file.

20 Claims, 7 Drawing Sheets

(56) References Cited

U.S. PATENT DOCUMENTS

| | | |
|---|---|---|
| 2006/0279628 A1 | 12/2006 | Fleming |
| 2008/0133488 A1 | 6/2008 | Bamdaru et al. |
| 2008/0154889 A1* | 6/2008 | Pfeiffer ............... G06F 16/738 |
| 2009/0327236 A1 | 12/2009 | Denney et al. |
| 2010/0119053 A1* | 5/2010 | Goeldi ............... G06Q 30/0251 |
| | | 379/265.09 |
| 2010/0306249 A1* | 12/2010 | Hill ............... G06Q 50/01 |
| | | 707/769 |
| 2012/0060093 A1 | 3/2012 | Lee |
| 2012/0096357 A1 | 4/2012 | Folgner et al. |
| 2012/0236201 A1* | 9/2012 | Larsen ............... H04N 21/439 |
| | | 348/468 |
| 2012/0323897 A1 | 12/2012 | Daher et al. |
| 2013/0297686 A1 | 11/2013 | Billinski et al. |
| 2014/0006415 A1 | 1/2014 | Rubchinsky |
| 2014/0143817 A1 | 5/2014 | Yeh |
| 2014/0213227 A1 | 7/2014 | Rao |
| 2014/0310746 A1* | 10/2014 | Larsen ............... H04N 21/242 |
| | | 725/37 |
| 2015/0106713 A1 | 4/2015 | Diamond et al. |
| 2015/0186368 A1 | 7/2015 | Zhang et al. |
| 2015/0312477 A1 | 10/2015 | Mate et al. |
| 2015/0350730 A1 | 12/2015 | el Kaliouby et al. |
| 2016/0203132 A1 | 7/2016 | King et al. |
| 2016/0328384 A1* | 11/2016 | Divakaran ............ G06F 40/169 |
| 2017/0017721 A1* | 1/2017 | Sauper ............... G06F 16/248 |
| 2017/0052964 A1 | 2/2017 | Hu et al. |

OTHER PUBLICATIONS

Mahadevan et al., "System and Method for Generating Contextually Relevant Preview of a Video," An IP.com Prior Art Database Technical Disclosure, Nov. 27, 2014, p. 1-2, IP.com No. 000239719, © Yahoo!.

Mell et al., "The NIST Definition of Cloud Computing," National Institute of Standards and Technology, Sep. 2011, p. 1-3, Special Publication 800-145.

Syeda-Mahmood et al., "Learning Video Browsing Behavior and its Application in the Generation of Video Previews," MM'01, Sep. 30-Oct. 5, 2001, p. 119-128, ACM, Ottawa, Canada.

* cited by examiner

VIDEO CLIPS GENERATION SYSTEM

BACKGROUND

The present invention relates generally to the field of computers, and more particularly to media.

A large number of videos and films are available on content providers. As such, it may be challenging for a person to select from the vast variety of choices in a short period of time. Therefore, many people often rely on social indicators, such as suggestions and advice of friends to assist in the selection of a video, film, movie, or television show. However, the social indicators may not be precise enough to ensure that the video, film, movie, or television show is a good choice for that particular person since such social indicators often do not take into account individual tastes.

SUMMARY

According to one embodiment, a method for generating a preview associated with a media file is provided. The method may include receiving a plurality of social comments associated with a plurality of frames corresponding to the media file. The method may also include storing the received plurality of social comments in a repository, whereby the received plurality of social comments is stored with a frame marker. The method may further include analyzing the stored plurality of social comments. The method may additionally include classifying the analyzed plurality of social comments according to at least one sentiment and at least one keyword in the media file.

According to another embodiment, a computer system for generating a preview associated with a media file is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of social comments associated with a plurality of frames corresponding to the media file. The method may also include storing the received plurality of social comments in a repository, whereby the received plurality of social comments is stored with a frame marker. The method may further include analyzing the stored plurality of social comments. The method may additionally include classifying the analyzed plurality of social comments according to at least one sentiment and at least one keyword in the media file.

According to yet another embodiment, a computer program product for generating a preview associated with a media file is provided. The computer program product may include one or more computer-readable storage devices and program instructions stored on at least one of the one or more tangible storage devices, the program instructions executable by a processor. The computer program product may include program instructions to receive a plurality of social comments associated with a plurality of frames corresponding to the media file. The computer program product may also include program instructions to store the received plurality of social comments in a repository, whereby the received plurality of social comments is stored with a frame marker. The computer program product may further include program instructions to analyze the stored plurality of social comments. The computer program product may additionally include program instructions to classify the analyzed plurality of social comments according to at least one sentiment and at least one keyword in the media file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
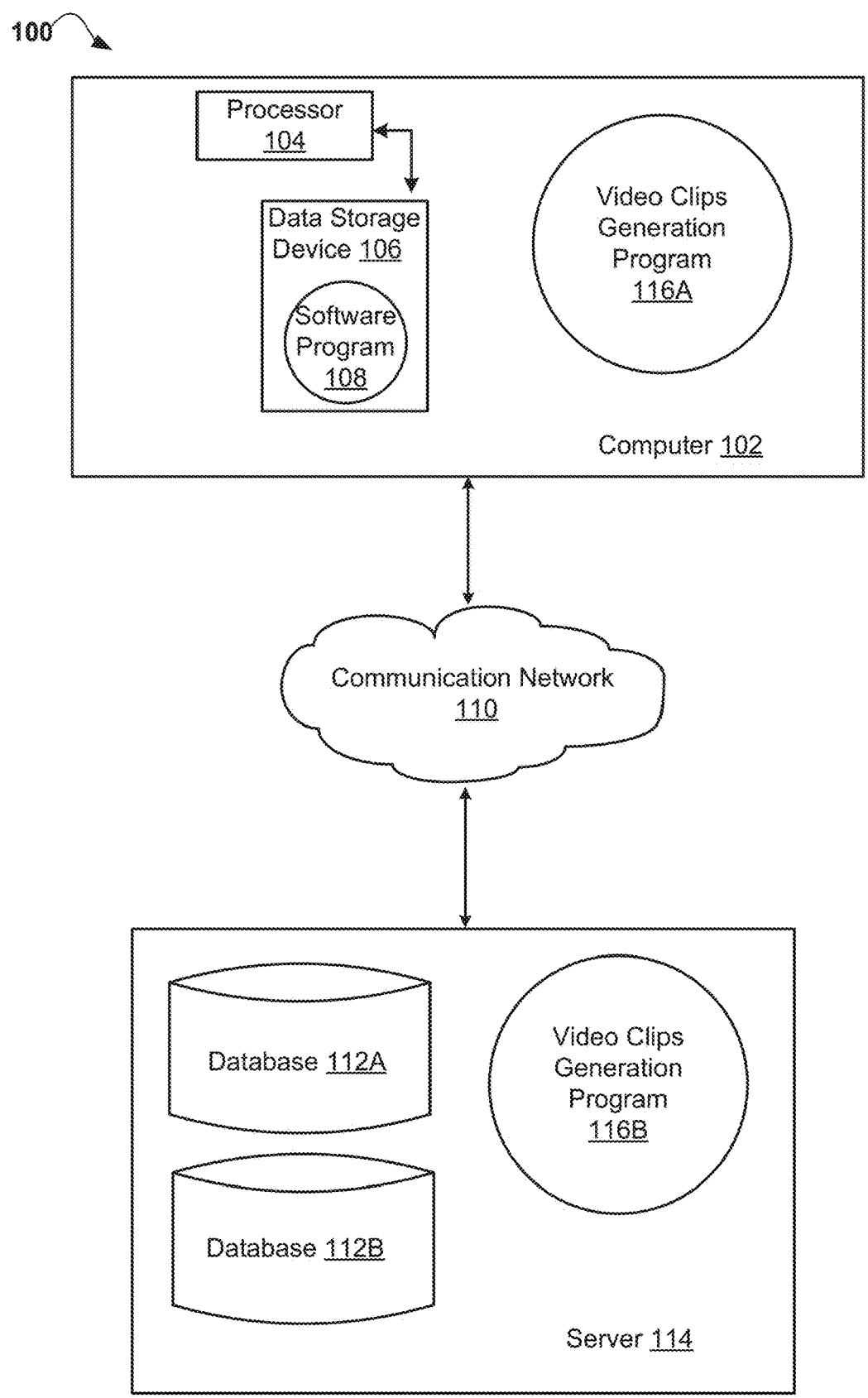
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to a media file, such as, but not limited to videos, films, movies, and television/network/cable shows. The following described exemplary embodiments provide a system, method and program product to, among other things, provide a video clip generation system. Therefore, the present embodiment has the capacity to improve the technical field of media by automatically generating a preview from semantic analysis of user comments on the frames of a media file (i.e., movies, videos, films, and television/network/cable shows). As such, the present embodiment may create a better preview for a media file, such as a movie. More specifically, the present embodiment may include a module that collects social comments about frames of a movie (i.e., media file) and stores them with a frame-marker and a module that analyzes the comments and classifies them according to sentiment and recognized keywords in the movie domain. Furthermore, the present embodiment may include a module that optionally takes a user inputted search string and collects the frames that have tagged comments that have positive sentiment and match the criteria of the search string (if present); collects a set of frames directly before and after the matched frames, to create a set of snippets from the movie; appends the snippets together into a preview; and a module to present the preview to the user. However, a user may also request to view a preview without entering a search string, whereby the preview is generated from appending a set of snippets including a collection of frames that are associated with the requested media file. Additionally, the preview can be generated from a plurality of media resources.

As previously described, a large number of videos and films are available on content providers. As such, it may be challenging for a person to select from the vast variety of choices in a short period of time. Currently, video clips or trailers are used as an advertising method to attract viewers. However, the video clips and trailers are typically pre-prepared by the film company. Therefore, these video clips and trailers may not always highlight the most popular aspects of the movie. Furthermore, since the video clips and trailers are prepared before the movie is available, they are often prepared without input from real viewers. Additionally, video reviews and comments may be used as a way to present information about the movie from real viewers, however, the reviews and comments may be limited to words and static pictures. As such, it may be advantageous, among other things, to automatically generate a preview from semantic analysis of user comments on the frames of the movie.

According to at least one implementation, the present embodiment may allow a user to submit comments about a frame of the movie or television series, by using a secondary device, such as a tablet or laptop connected to the service streaming the film or TV show series, or through a pause menu on the viewing device itself. The present embodiment may also contain a module that performs semantic analysis of the user entered comments on each frame to determine which frames invoked a positive emotional response such as excitement or enjoyment, or contained certain objects or actors/actresses. For example, if a user wants to watch a 3 minute movie that only contains a certain actor or actress, the user may input the duration as 3 minutes, and input the actor's or actress' name as keywords. Then, the present embodiment can output the customized clips.

More specifically, the present embodiment may connect input from different users via the internet (or a graphical user interface, an online communication system, or a use of social media) and may satisfy a large number of media (including, but not limited to movies, shows, videos, etc.). Also, the present embodiment may allow the user to search movies based on the social comments made on parts of the movies in addition to allowing the user a mechanism to provide their own input into what they are interested in.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating video clips. According to at least one implementation, the present embodiment may provide interactive activities between users by generating video clips that are irrespective of the movie itself. As such, a user may utilize the generated video clips to find videos more quickly based on the user's interests.

Referring to FIG. 1, an exemplary networked computer environment 100 in accordance with one embodiment is depicted. The networked computer environment 100 may include a computer 102, a processor 104, and a data storage device 106 that is enabled to run a software program 108 and a Video Clips Generation Program 116A. The networked computer environment 100 may also include a server 114 that is enabled to run a Video Clips Generation Program 116B and that may interact with a database 112A, 112B and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Video Clips Generation Program 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112A, 112B. According to various implementations of the present embodiment, the Video Clips Generation Program 116A, 116B may interact with a database 112A, 112B that may be embedded in various storage devices, such as, but not limited to a computer 102, a networked server 114, or a cloud storage service.

As previously described, the client computer 102 may access the Video Clips Generation Program 116B, running on server computer 114 via the communications network 110. For example the Video Clips Generation Program 116A, 116B running on a client computer 102 and server computer 114 may allow a user to submit comments about a frame of the movie or television series, by using a secondary device 102, such as a tablet or laptop connected to the service streaming the film or TV show series, or through a pause menu on the viewing device 102 itself. The present embodiment may also contain a module (which will be explained in further detail in FIG. 2) that performs semantic analysis of the user entered comments on each frame to determine which frames invoked a positive emotional response, such as excitement or enjoyment, or contained certain objects or a specific actor or actress. The Video Clips Generation method is explained in more detail below with respect to FIGS. 2-3B.

Figure 2:
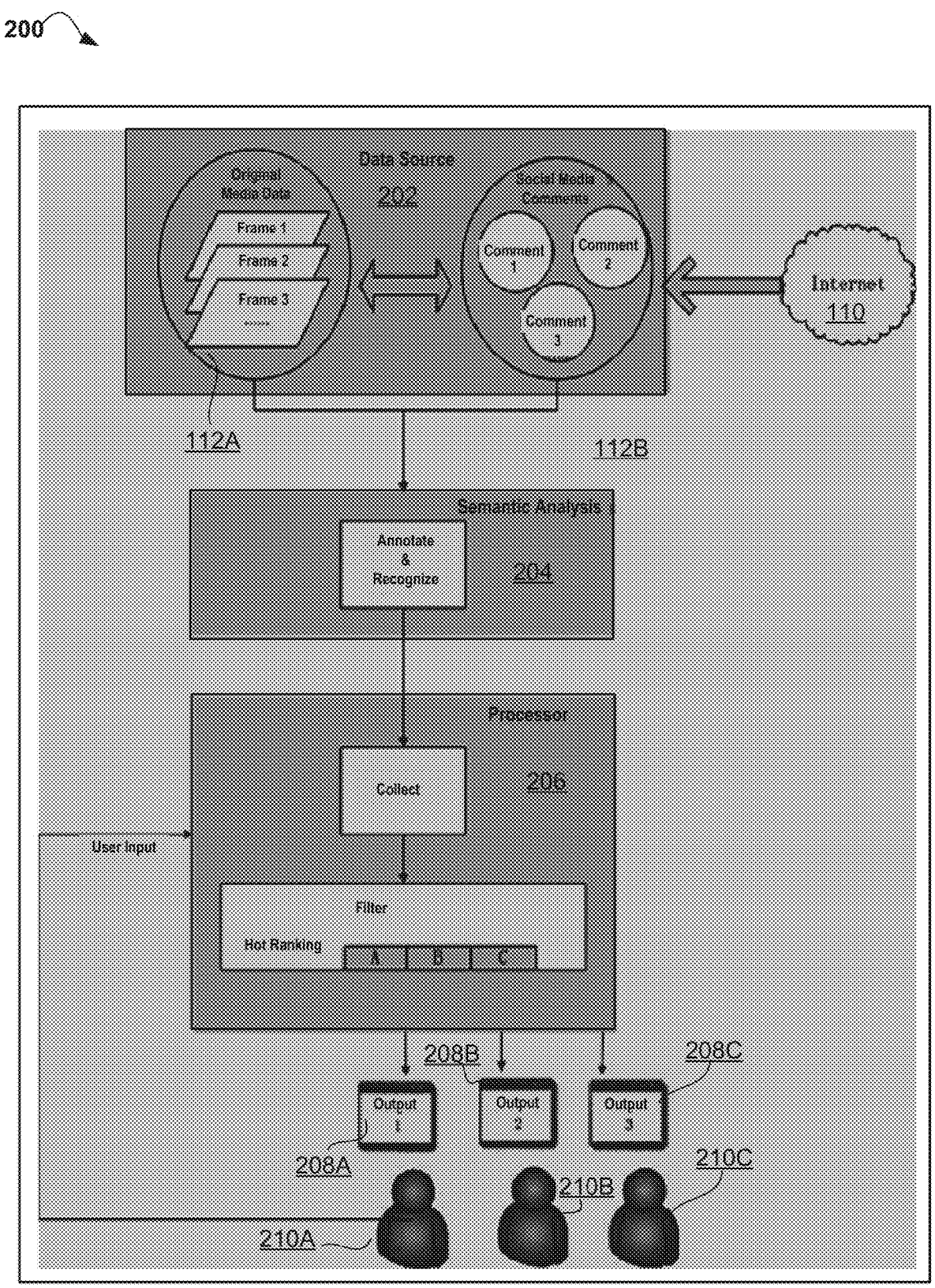
FIG. 2 illustrates an exemplary system architecture according to at least one embodiment.

Referring now to FIG. 2, an exemplary system architecture 200 in accordance with one embodiment is depicted. According to at least one implementation, the present embodiment may include a data source 202, such as two databases 112A, 112B. One database 112A is for the movie, with frame markers. The other database 112B may be utilized as a storage of social media comments, tagged against the movie and the frame marker.

The present embodiment may also include a semantic analysis component 204 which is based on existing technology. As such, a semantic module 204 using existing mechanisms for semantic analysis may annotate each user comment with sentiment. Additionally, the semantic module may recognize movie related keywords, such as an actor's name or a location of a movie set.

Next, a processor 206, may collect the annotated information and filter the appropriate frame markers, given the desired sentiment and/or recognized keywords. Then, the output 208A-208C combines the frames into a final preview which is presented to the user 210A-210C.

Figure 3A:
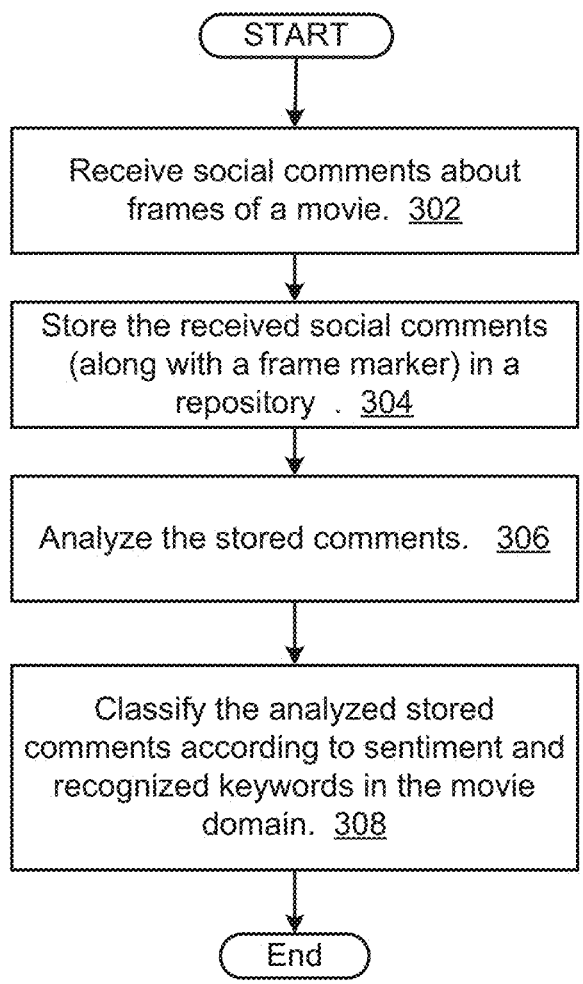
FIGS. 3A-3B are operational flowcharts illustrating the steps carried out by a program to generate video clips according to at least one embodiment.
Figure 3B:
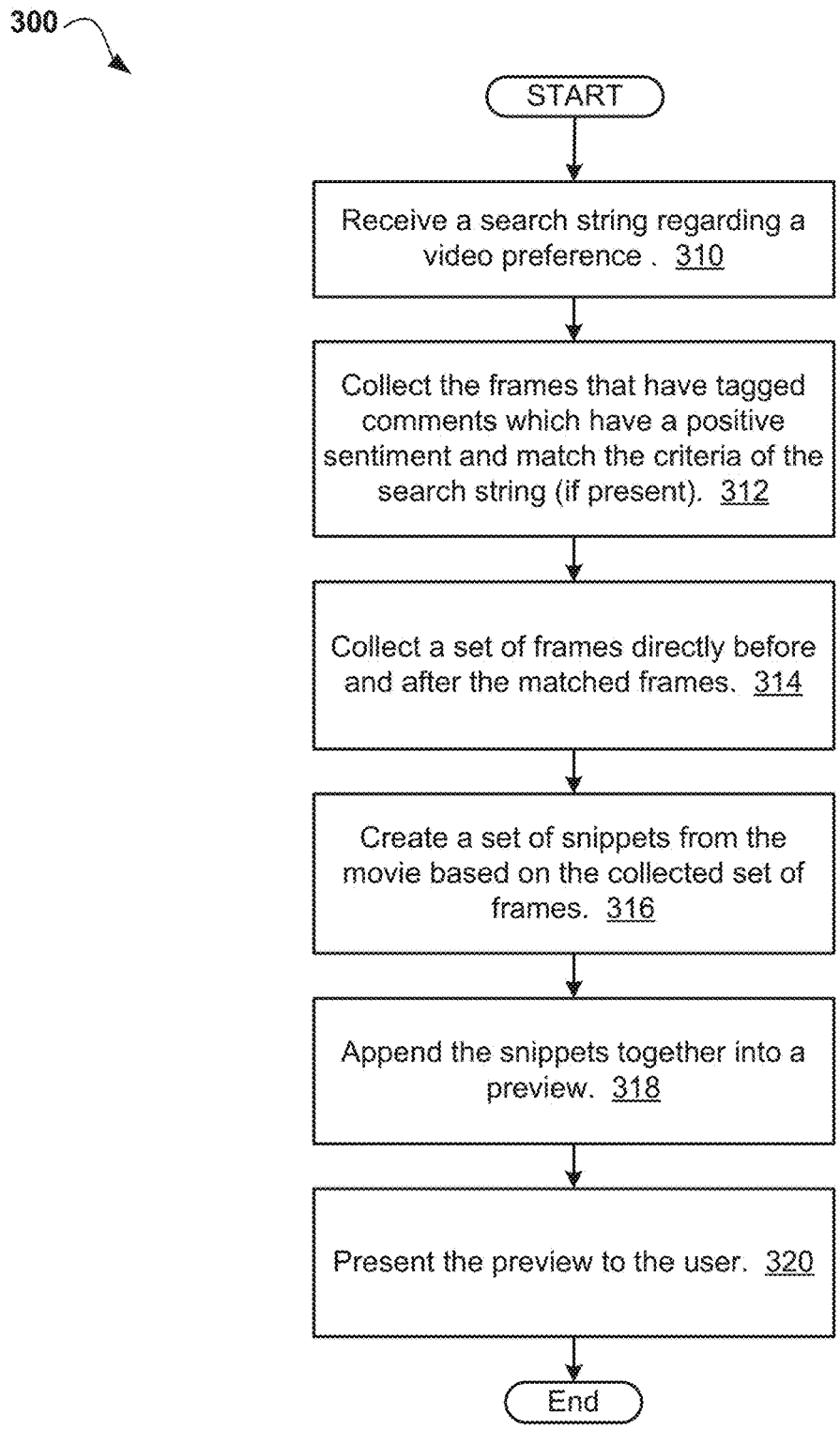

Referring now to FIGS. 3A-3B, operational flowcharts 300 illustrating the steps carried out by a program that generates video clips in accordance with one embodiment are depicted. According to at least one implementation, the present embodiment may dynamically create a preview for a given video based on a search string. The preview may be created by consuming a set of social comments on the individual frames on a video, and piecing together the closest matching scenes whose social comments matched the search string. As such, a dynamically created and highly targeted preview for a video is provided to a user, which may improve the ability for a customer to decide if the video is a video that the person would want to watch or not.

With respect to FIG. 3A at 302, social comments (i.e., social media comments) are received about frames of a movie. For example, a user may submit comments about a frame of a movie or television series, by using a secondary device 102 (FIG. 1), such as a tablet or laptop connected to the service streaming the film or the TV show series. However, in an alternate implementation, the user may enter such comments through a pause menu (i.e., GUI) on the viewing device itself.

Then at 304, the user entered social comments are stored (along with a frame marker) in a repository, such as a database 112B (FIG. 1). As previously described, the present embodiment may include the use of two databases 112A, 112B (FIG. 1). One database 112A (FIG. 1) is for the movie, with frame markers. The other database 112B (FIG. 1) may be utilized as a storage of social media comments, tagged against the movie and the frame marker.

Next at 306, the stored comments are analyzed. According to at least one implementation, a module 204 (FIG. 2) may perform semantic analysis (using existing technology) of the user entered comments on each frame to determine which frames invoked a positive emotional response such as excitement or enjoyment, or contained certain objects, location of sets, actors, or actresses.

Then at 308, the analyzed stored comments are classified according to sentiment and recognized keywords in the movie domain. As previously explained, a semantic analysis module may annotate each user comment with sentiment.

Optionally, the present embodiment may utilize a user inputted search string (entered via a graphical user interface, for example) to dynamically create a preview for a given video based on the entered search string. Therefore, with respect to FIG. 3B at 310, a search string regarding a video preference is received. For example, if a user wants to watch a 3 minute movie that only contains a certain actor or actress, the user may input the duration as 3 minutes, and input the actor's or actress' name as keywords.

Then at 312, the frames that have tagged comments which have a positive sentiment and match the criteria of the entered search string are collected (if present). As previously described, a processor 206 (FIG. 2) may collect the annotated information and filter the appropriate frame markers, given the desired sentiment and/or recognized keywords.

Next at 314, a set of frames directly before and after the matched frames are collected and then at 316, a set of snippets (based on the collected set of frames from step 314) are created. Next at 318, the created set of snippets ae appended together (i.e., the collected frames are combined together) into a preview and then at 320 the preview is presented to the user. As such, the preview is created based on the user defined search terms and social metadata attached to the video.

It may be appreciated that FIGS. 2 and 3A-3B provide only an illustration of one implementation and do not imply any limitations with regard to how different embodiments may be implemented. Many modifications to the depicted environments may be made based on design and implementation requirements. As previously mentioned, the present embodiment may optionally utilize a user inputted search string to dynamically create a preview for a given video based on the entered search string.

As such, by generating the preview dynamically through semantic analysis the preview would have benefits over a pre-provided preview. For example, by allowing the user to enter what they are interested in, the preview can be tailored to their interests, which may have a higher probability of capturing their interest in that particular movie. As such, this may increase viewership of the movies and shows provided by the service and may increases customer satisfaction. Additionally, by using the present embodiment, even without user entry of interests, the system can generate a preview of the scenes that were the best received by existing viewers, leading to a higher quality preview. Furthermore, the preview generation can be combined with existing search capabilities enhancing the results that are returned from the search.

The present embodiment automatically creates a preview from a video based on a user's search string and makes use of social comments associated to the frames of the video, to extract the relevant content and generate the preview. As such, the present embodiment generates the preview clip from social comments provided on the video source frames, and is able to generate the preview from parts of the video whose social comments relate to the search. As a result, the present embodiment may provide for a richer search capability based on how others have interpreted the content of the video. More specifically, the preview is created based on the user defined search terms and social metadata attached to the video in order to recognize relevant content in the video.

Figure 4:
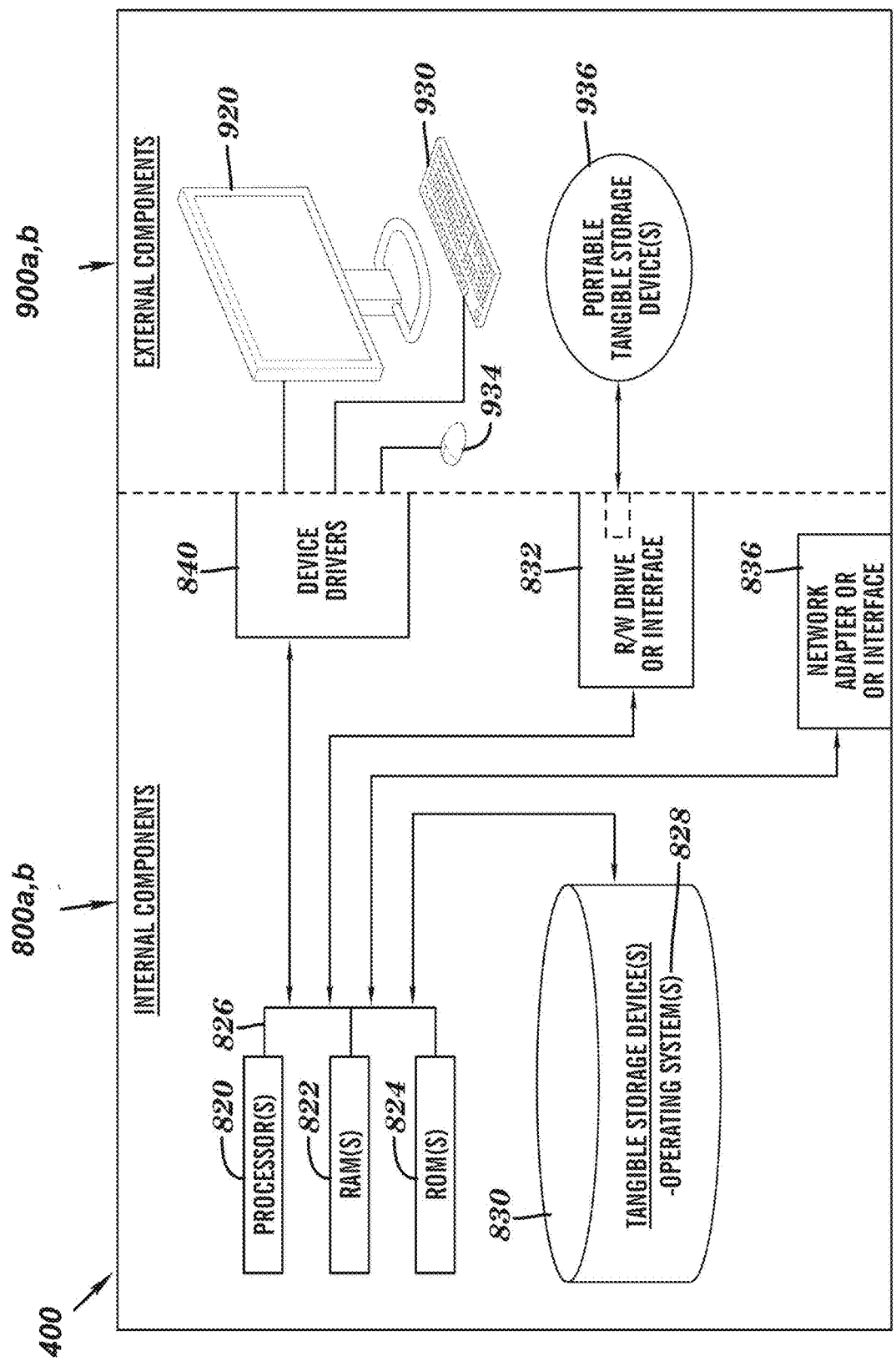
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800*a,b* and external components 900*a,b* illustrated in FIG. 4.

Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Video Clips Generation Program 116A (FIG. 1) in client computer 102 (FIG. 1) and the Video Clips Generation Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Video Clips Generation Program 116A, 116B (FIG. 1) can be stored on one or more of the respective portable computer-readable tangible storage devices 936, read via the respective R/W drive or interface 832 and loaded into the respective hard drive 830.

Each set of internal components 800a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Video Clips Generation Program 116A (FIG. 1) in client computer 102 (FIG. 1) and the Video Clips Generation Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Video Clips Generation Program 116A (FIG. 1) in client computer 102 (FIG. 1) and the Video Clips Generation Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
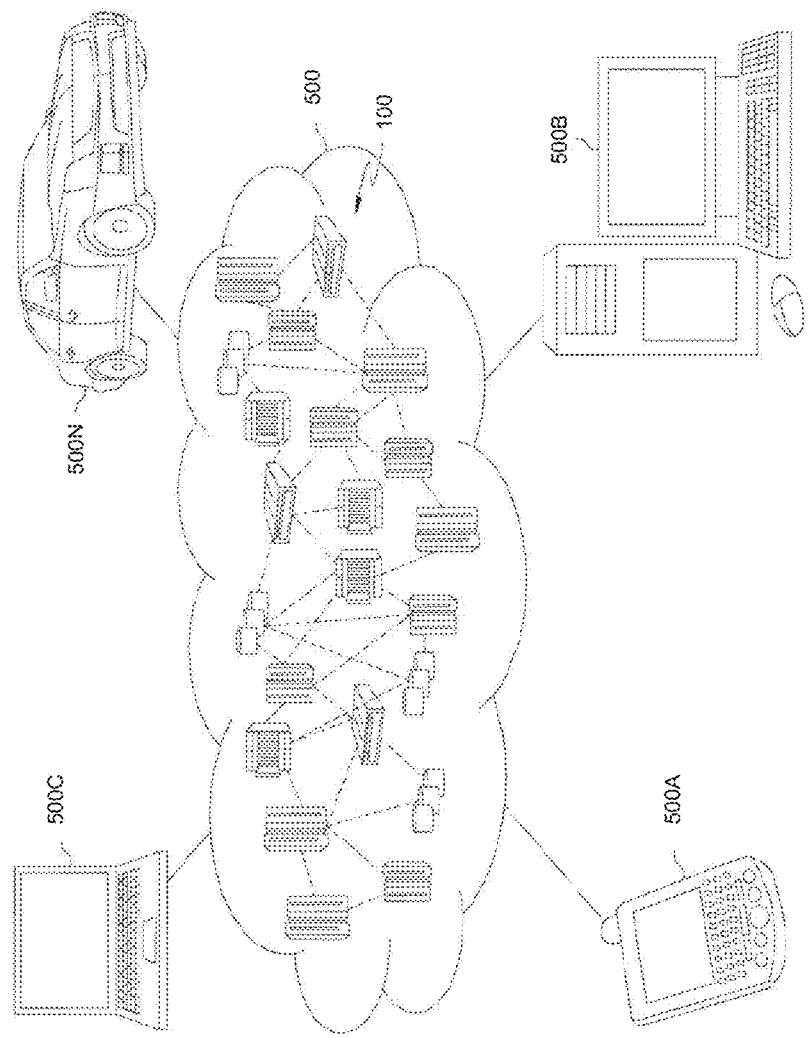
FIG. 5 is a block diagram of an illustrative cloud computing environment including the computer system depicted in FIG. 1, according to at least one embodiment.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
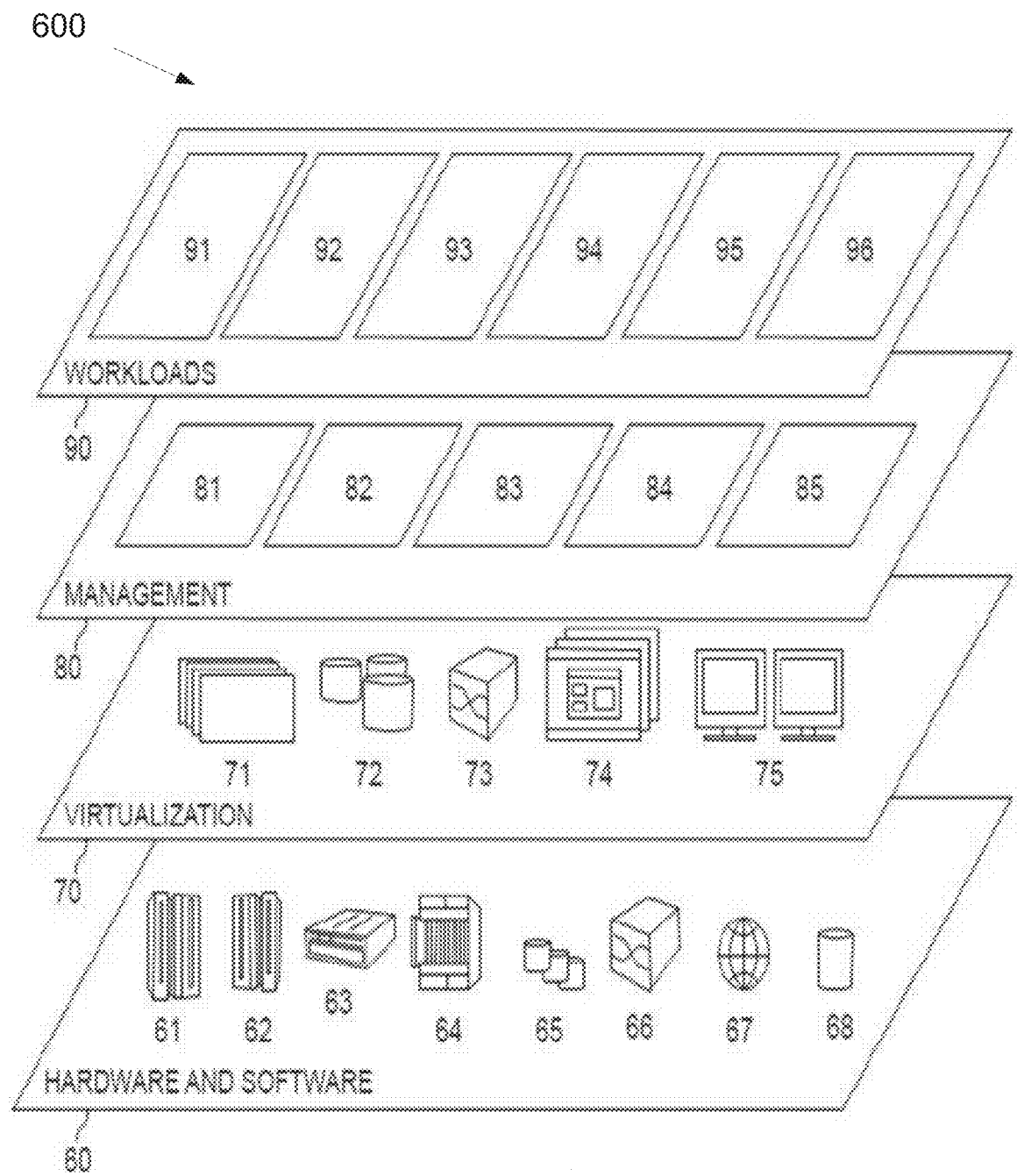
FIG. 6 is a block diagram of functional layers of the illustrative cloud computing environment of FIG. 5, according to at least one embodiment.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video clips generation 96. A Video Clips Generation Program 116A, 116B (FIG. 1) may provide a video clip generation system which may improve the technical field of media by automatically generating a preview from semantic analysis of user comments on the frames of the movie (i.e., videos, films, and television/network/cable shows).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a preview associated with a media file, the method comprising:

receiving, by a processor, a plurality of social comments associated with a plurality of frames corresponding to the media file, wherein the received plurality of social comments comprises collecting a plurality of input from a plurality of different users, wherein the plurality of input is obtained live via an internet, a graphical user interface, an online communication system, or a use of social media via a secondary device connected to a service streaming the media file;

storing the streaming media file in a first repository with a plurality of frame markers corresponding to the stored streaming media file;

storing the received plurality of social comments in a second repository, analyzing the stored plurality of social comments;

annotating each social comment within the analyzed plurality of social comments with at least one sentiment and at least one keyword in the media file;

classifying the analyzed annotated plurality of social comments according to the at least one sentiment and the at least one keyword in the media file, wherein classifying the annotated plurality of social comments comprises determining a plurality of positive sentiments about a plurality of frames associated with the media file;

receiving a search string regarding a media file preference, wherein the search string is inputted online by a user;

in response to receiving the search string regarding the media file preference, determining from the first repository and the second repository a first plurality of frames that match a criteria associated with the received search string;

determining a second plurality of frames that include a set of frames directly before and a set of frames directly after the determined first plurality of frames that match the criteria associated with the search string;

creating a set of snippets based on the determined first plurality of frames and the determined second plurality of frames; and appending the created set of snippets together into an online preview.

2. The method of claim 1, further comprising:
presenting the preview to the user, wherein the presented preview is generated from a plurality of media resources.

3. The method of claim 1, further comprising:
in response to a request by a user to view a preview associated with a media file, presenting the preview to the user, wherein the preview is generated from appending a set of snippets comprising a collected plurality of frames that are associated with the requested media file.

4. The method of claim 2, wherein the received search string is inputted via a graphical user interface.

5. The method of claim 1, wherein the received plurality of social comments is stored and tagged to correlate to the stored steaming media file and corresponding frame marker within the plurality of frame markers.

6. The method of claim 1, wherein the media file comprises at least one of a plurality of movies, a plurality of videos, a plurality of films, a plurality of television shows, a plurality of network shows, and a plurality of cable shows.

7. The method of claim 1, wherein the analyzing comprises the use of a plurality of semantic analysis techniques.

8. The method of claim 1, wherein the received plurality of social comments is entered by using a secondary device connected to a service streaming the media file or through a pause menu on a viewing device streaming the media file.

9. The method of claim 1, wherein the determined first plurality of frames are associated with at least one positive sentiment within the determined plurality of positive sentiments.

10. A computer system for generating a preview associated with a media file, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving a plurality of social comments associated with a plurality of frames corresponding to the media file, wherein the received plurality of social comments comprises collecting a plurality of input from a plurality of different users, wherein the plurality of input is obtained live via an internet, a graphical user interface, an online communication system, or a use of social media via a secondary device connected to a service streaming the media file;

storing the streaming media file in a first repository with a plurality of frame markers corresponding to the stored streaming media file;

storing the received plurality of social comments in a second repository, analyzing the stored plurality of social comments;

annotating each social comment within the analyzed plurality of social comments with at least one sentiment and at least one keyword in the media file;

classifying the analyzed annotated plurality of social comments according to the at least one sentiment and the at least one keyword in the media file, wherein classifying the annotated plurality of social comments comprises determining a plurality of positive sentiments about a plurality of frames associated with the media file;

receiving a search string regarding a media file preference, wherein the search string is inputted online by a user;

in response to receiving the search string regarding the media file preference, determining from the first repository and the second repository a first plurality of frames that match a criteria associated with the received search string;

determining a second plurality of frames that include a set of frames directly before and a set of frames directly after the determined first plurality of frames that match the criteria associated with the search string;

creating a set of snippets based on the determined first plurality of frames and the determined second plurality of frames; and appending the created set of snippets together into an online preview.

11. The computer system of claim 10, further comprising:
presenting the preview to the user, wherein the presented preview is generated from a plurality of media resources.

12. The computer system of claim 10, further comprising:
in response to a request by a user to view a preview associated with a media file, presenting the preview to the user, wherein the preview is generated from appending a set of snippets comprising a collected plurality of frames that are associated with the requested media file.

13. The computer system of claim 11, wherein the received search string is inputted via a graphical user interface.

14. The computer system of claim 10, wherein the received plurality of social comments is stored and tagged to correlate to the stored steaming media file and corresponding frame marker within the plurality of frame markers.

15. The computer system of claim 10, wherein the media file comprises at least one of a plurality of movies, a plurality of videos, a plurality of films, a plurality of television shows, a plurality of network shows, and a plurality of cable shows.

16. The computer system of claim 10, wherein the analyzing comprises the use of a plurality of semantic analysis techniques.

17. The computer system of claim 10, wherein the received plurality of social comments is entered by using a secondary device connected to a service streaming the media file or through a pause menu on a viewing device streaming the media file.

18. The computer system of claim 10, wherein the determined first plurality of frames are associated with at least one positive sentiment within the determined plurality of positive sentiments.

19. A computer program product for generating a preview associated with a media file, the computer program product comprising:

one or more computer-readable storage devices and program instructions stored on at least one of the one or more tangible storage devices, the program instructions executable by a processor, the program instructions comprising:

program instructions to receive a plurality of social comments associated with a plurality of frames corresponding to the media file, wherein the received plurality of social comments comprises collecting a plurality of input from a plurality of different users, wherein the plurality of input is obtained live via an internet, a graphical user interface, an online communication system, or a use of social media via a secondary device connected to a service streaming the media file;

program instructions to store the streaming media file in a first repository with a plurality of frame markers corresponding to the stored streaming media file;

program instructions to store the received plurality of social comments in a second repository, program instructions to analyze the stored plurality of social comments;

program instructions to annotate each social comment within the analyzed plurality of social comments with at least one sentiment and at least one keyword in the media file;

program instructions to classify the analyzed annotated plurality of social comments according to the at least one sentiment and the at least one keyword in the media file, wherein classifying the annotated plurality of social comments comprises determining a plurality of positive sentiments about a plurality of frames associated with the media file;

program instructions to receive a search string regarding a media file preference, wherein the search string is inputted online by a user;

in response to receiving the search string regarding the media file preference, program instructions to determine from the first repository and the second repository a first plurality of frames that match a criteria associated with the received search string;

program instructions to determine a second plurality of frames that include a set of frames directly before and a set of frames directly after the determined first plurality of frames that match the criteria associated with the search string;

program instructions to create a set of snippets based on the determined first plurality of frames and the determined second plurality of frames; and program instructions to append the created set of snippets together into an online preview.

20. The computer program product of claim 19, further comprising:

program instructions to present the preview to the user, wherein the presented preview is generated from a plurality of media resources.

* * * * *